(12) United States Patent
Kramer

(10) Patent No.: US 9,976,680 B2
(45) Date of Patent: May 22, 2018

(54) SEAL ELEMENT FOR ISOLATION GASKET

(71) Applicant: Lamons Gasket Company, Houston, TX (US)

(72) Inventor: Benjamin D. Kramer, Littleton, CO (US)

(73) Assignee: LAMONS GASKET COMPANY, Houston, TX (US)

( * ) Notice: Subject to any disclaimer, the term of this patent is extended or adjusted under 35 U.S.C. 154(b) by 0 days. days.

(21) Appl. No.: 14/843,756

(22) Filed: Sep. 2, 2015

(65) Prior Publication Data

US 2015/0377394 A1 Dec. 31, 2015

Related U.S. Application Data

(63) Continuation of application No. PCT/US2014/020330, filed on Mar. 4, 2014.

(60) Provisional application No. 61/772,729, filed on Mar. 5, 2013.

(51) Int. Cl.
| | |
|---|---|
| *F16J 15/10* | (2006.01) |
| *F16L 23/16* | (2006.01) |
| *F16L 23/18* | (2006.01) |
| *F16L 17/073* | (2006.01) |
| *F16L 25/02* | (2006.01) |

(52) U.S. Cl.
CPC .............. *F16L 23/16* (2013.01); *F16J 15/104* (2013.01); *F16L 23/18* (2013.01); *F16L 25/02* (2013.01); *F16L 25/026* (2013.01); *F16L 17/073* (2013.01)

(58) Field of Classification Search
CPC .......... F16L 23/16; F16L 23/18; F16L 25/026; F16L 17/073; F16J 15/104; F16J 15/127
See application file for complete search history.

(56) References Cited

U.S. PATENT DOCUMENTS

| | | | | |
|---|---|---|---|---|
| 3,462,161 | A * | 8/1969 | Daubenberger | F16J 15/104 277/606 |
| 4,776,600 | A * | 10/1988 | Kohn | F16L 25/026 277/611 |
| 5,316,320 | A * | 5/1994 | Breaker | F16L 23/18 277/611 |
| 5,564,715 | A * | 10/1996 | Wallace | F16J 15/127 277/612 |
| 5,938,246 | A * | 8/1999 | Wallace | F16L 23/18 277/314 |
| 6,695,357 | B2 | 2/2004 | Schenk et al. | |
| 7,976,074 | B2 * | 7/2011 | Anderson | F16L 23/18 285/110 |

(Continued)

OTHER PUBLICATIONS

International Search Report and Written Opinion issued in PCT/US2012/020330, dated Jun. 18, 2014, 15 pgs.

*Primary Examiner* — Nicholas L Foster
(74) *Attorney, Agent, or Firm* — McDonald Hopkins LLC

(57) ABSTRACT

A gasket for use between adjoining pipe flanges includes a retainer which defines a bore and includes a first face and an opposite second face. The retainer is constructed and arranged with a first groove in the first face and with a second groove in the second face, the first groove includes a first form for seal retention and the first seal element includes a first cooperating form for retention of the seal element within the first groove. A second seal element is received within the second groove and the retention of each seal element within its respective groove is accomplished without the use of a bonding material.

6 Claims, 10 Drawing Sheets

(56) References Cited

U.S. PATENT DOCUMENTS

| | | | |
|---|---|---|---|
| 8,678,398 B2 * | 3/2014 | Anderson | F16L 23/18 277/608 |
| 2002/0030326 A1 | 3/2002 | Bettencourt | |
| 2009/0243290 A1 * | 10/2009 | Anderson | F16L 23/18 285/343 |
| 2010/0013220 A1 | 1/2010 | Rao et al. | |
| 2011/0266755 A1 * | 11/2011 | Anderson | F16L 23/18 277/611 |

* cited by examiner

Fig. 22
FIG. 23
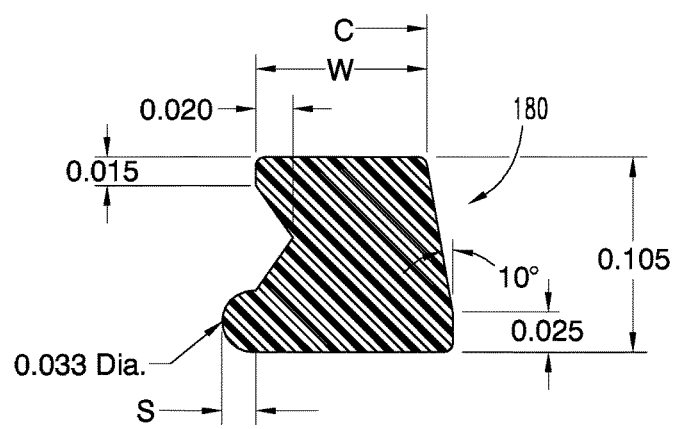
Fig. 23

SEAL ELEMENT FOR ISOLATION GASKET

CROSS-REFERENCE TO RELATED APPLICATION

This application is a continuation of International Application No. PCT/US2014/020330 filed Mar. 4, 2014, which claims the benefit of U.S. Provisional Application No. 61/772,729 filed Mar. 5, 2013, which are hereby incorporated by reference.

BACKGROUND

Speaking only generally regarding the broad types or categories of pipe sealing gaskets which may be used, one option is to simply provide a full face or ring type elastomeric gasket. However, as the applications become more demanding in terms of materials, pressures and temperatures, the gasket constructions become more sophisticated in performance and complex in construction. One step in trying to tailor the gasket construction to the particular sealing application is to create a gasket assembly which allows one to select different materials for the different component parts of that gasket assembly.

Sealing/isolating gasket systems are used when electrical isolation and corrosion control are required on pipes handling gas, natural gas, oil and other hydrocarbon-based medias. These fluid materials are "transported" from one point to another by flowing through adjoining pipe sections. These adjoining pipe sections include end flanges which are securely joined together, typically being bolted together. These pipe end flanges may be generally circular or other suitable shapes. In order to provide the referenced electrical isolation and corrosion control, one approach is to use what is referred to in this industry as an isolation gasket. This isolation gasket is positioned between the adjacent and connected flanges of two joined pipe sections. The type of gasket being described is constructed and arranged for what are best described as critical or extreme applications, including for example the handling of fluid materials which are at an elevated temperature, up to approximately 392 degrees F. (200 degrees C.). The specifications for the type of referenced pipe flanges include, for example, flat face, raised face and ring type joint flanges. These range in NPS size from 0.50 inches to 96.0 inches and greater. Other rating information for these types of gaskets include pressure ratings of ANSI 150-2500# and API 2-10K.

Isolation gaskets of the general type being described herein include a retainer, often using a fiberglass-like material, and an elastomeric or polymeric seal element which is received within a groove which is formed or machined into a surface of the retainer. One consideration is how best to capture the seal element in the groove. While a bonding agent or bonding material might be used, this approach requires a certain amount of time in order for that agent or material to set up and fully cure. This time delay slows the overall assembly process and there is a potential for the seal element which is being bonded in place to shift or move before the agent or material is fully cured. Another concern with this approach using a bonding agent or bonding material is that the seal element is securely locked in that groove and this prevents any type of easy replacement or exchange of that seal element in the event of repair or damage or in the event a different type or style of seal element would be desired. Once bonded in position, removal of that seal element requires some degree of groove clean up and thus a further time delay, particularly when the retainer is to be reused.

Disclosed herein are three isolation gasket constructions. Each of the first two isolation gasket constructions, as described herein, include certain structural characteristics which are seen as beneficial in terms of their resultant performance for certain pipe sealing applications or tasks. The third isolation gasket construction which is disclosed herein focuses on creating a novel and unobvious structural combination of features of each of the first two isolation gasket constructions which provide or contribute to those beneficial attributes.

The first type of isolation gasket which is disclosed herein is a gasket which is constructed with an approximate 0.125 inch thick laminate core with a corresponding deformation-based annular seal element seated in an annular groove in each face of the laminate core. The second type of isolation gasket disclosed herein is a gasket which has a thickness of approximately 0.250 inches-0.305 inches and is constructed and arranged with a steel core faced with a non-metal material. The preferred facing material is a synthetic material such as fiberglass. Spaced apart from the defined bore on each face is a seal element (preferably Teflon®) which is captured within an annular groove and is spring energized by a stainless steel spring.

Each of these isolation gaskets, referring now to the two types described above, has a construction resulting in certain design properties which are preferable or advantageous for certain applications or tasks, but which may be considered to be less than optimal for other applications or tasks which still require some degree of sealing and electrical isolation by using gaskets of this type. For example, the first style of isolation gasket, the one with the thinner laminate core, may not be considered quite as reliable as the second style of isolation gasket, in terms of high pressure applications. Since the laminate layers of these types of gaskets are constructed and arranged with a groove for receipt of the seal element, the thinner laminate limits the cross-sectional size of the annular seal element which may be used. With regard to the second style of isolation gasket, this style is generally regarded as capable of effective sealing at higher pressures as compared to the first style. Again, this is due to the nature of the seal element which may be utilized. However, with the second style of isolation gasket, the presence of a steel core may not allow optimal electrical isolation as it introduces metal into the electrical isolation equation. There are also further issues with regard to the use of a glass reinforced epoxy (GRE) laminate material which is regarded as having certain issues as its thickness increases.

In some of the gasket constructions which are disclosed herein, including variations and alternative embodiments, the seal elements are captured within their corresponding groove within the retainer based on the contours, shapes and geometries of those retainer grooves and of the specific seal elements. The seal elements are retained and captured within their corresponding grooves without the use of a bonding agent or bonding material, such as glue or adhesive, being applied on the key contact surfaces.

SUMMARY

Isolation gaskets are disclosed which are constructed and arranged for specific sealing applications for joined pipe flanges. The first two isolation gasket constructions disclosed herein are intended to broadly or generically represent two of the currently offered isolation gasket styles. In each instance though, specific design changes have been made to improve performance and sealing reliability. The third isolation gasket disclosed herein incorporates beneficial structural features of the first two gasket constructions in order to achieve a desirable blend of performance features. This third isolation gasket is constructed and arranged with a combination of structural features in a way which provides these desirable attributes. This disclosed isolation gasket is a compromise between the thinner laminate core gasket of the first construction and the thicker steel core gasket of the second construction. Some of the design aspects and considerations of these types of isolation gaskets are discussed in the Background.

In two of the three gasket constructions disclosed herein, the groove which is formed or machined into each face of the retainer is shaped and contoured with a radially-protruding lip. Each seal element is shaped with a corresponding and cooperating protruding portion which is actually captured axially beneath the radially-protruding lip. This arrangement, in cooperation with the remaining shaping and contouring of the grooves and of the seal elements, results in the capture of each seal element within its corresponding groove without the use of any bonding agent or bonding material, such as glue or adhesive, being applied on the key contact surfaces.

The thinner laminate core style of isolation gasket is typically constructed and arranged with a thickness in the range of approximately 0.125 inches. This gasket style includes simple deformation based seal elements. Without the use of spring energized seal elements and without the option for using larger or thicker seal elements, this type of isolation gasket may not be as reliable as a gasket with either a spring energized or pressure energized seal element or a larger/thicker seal element, at least for certain applications. For example, the first isolation gasket construction may not be capable of holding the higher pressure which are able to be held by isolation gaskets with spring energized or pressure energized seal elements.

The thicker core or laminate gasket style (i.e. the second isolation gasket construction described herein) has a thickness which is generally in the range of 0.250 inches to 0.305 inches. This style of isolation gasket is constructed and arranged with laminated face gaskets which use spring energized seal elements. Spring energized seal elements are considered to be more reliable and should be capable of holding higher pressures as compared to gasket constructions without spring energized seal elements. However, the current constructions of this general type of gasket includes a steel core. The presence of a steel core does not allow optimal electrical isolation, as this construction introduces metal into the overall sealing and isolation equation.

One attempt to provide an improved isolation gasket was to simply make a thicker (approximately 0.250 inches) glass epoxy core. This thicker gasket design would presumably allow for the use of a larger spring energized seal element. However, making the glass epoxy thicker simply compounds the inherent problems with GRE (glass reinforced epoxy) laminates. It is generally known that the greater the number of layers, i.e. the thicker the glass epoxy laminate, the more severe the problems of material creep and degradation under load and temperature. The construction and arrangement of the third isolation gasket which is disclosed herein is the result of (1) looking at any drawbacks which either the first two isolation gasket constructions may have, as discussed above and (2) trying to capture the desirable structural characteristics of each style without those drawbacks. The third isolation gasket construction disclosed herein has taken desirable structural characteristics from the first two gasket constructions and blended those structural characteristics into a novel and unobvious isolation gasket for use between adjoining pipe flanges.

More specifically, the third disclosed isolation gasket has selected a compromised thickness dimension for the GRE material in order to reduce the negative effects of temperature and pressure. In the other direction, the thickness has been made just thick enough to allow for a pressure energized seal element to be installed in a face groove of the laminate. This structural combination results in what would be considered an optimal gasket thickness and as a result, optimal overall sealing performance. Importantly, for an isolation gasket, any metal has been eliminated from the gasketed pipe flange joined which is desired to be electrically isolated.

The term "optimal" as used herein in conjunction with the thickness dimension, is used in a relative sense regarding the GRE material. When this material is thicker, the material creep and degradation under load and temperature problems are more severe. These problems lessen in severity as the thickness of the material is reduced. However, if a pressure energized seal element is going to be incorporated into the gasket construction, there needs to be a minimal thickness of the laminate to be able to receive and capture the seal element in the face groove.

In the course of evaluating the GRE thickness necessary for effective gasket sealing using a pressure energized seal element, it was learned that the preferred axial thickness as a blend or balancing between the two extremes would be 0.158 plus or minus 0.005 inches. This dimensional range for the axial thickness allows for the use of PTFE (Teflon®) seal element and/or custom polymer O-rings. The elimination of metal from the gasket allows optimal electrical isolation for the flanged pipe joined where the isolation gasket is used, as metal is now removed from the gasket sealing equation.

In addition to the size relationships and structural compromises described above for two of the three gaskets disclosed herein, each seal element is shaped in a corresponding manner relative to the shaping of the corresponding groove such that the seal element is captured and retained without the need to use any bonding agent or bonding material, such as glue or adhesive, on the critical or key contact surfaces.

BRIEF DESCRIPTION OF THE DRAWINGS

FIG. 22 side elevational view of an alternative seal element which is suitable for use in the FIG. 15 isolation gasket.

FIG. 23 is an enlarged side elevational view, as a lateral section, of the FIG. 22 seal element.

DESCRIPTION OF SELECTED EMBODIMENTS

Figure 1:
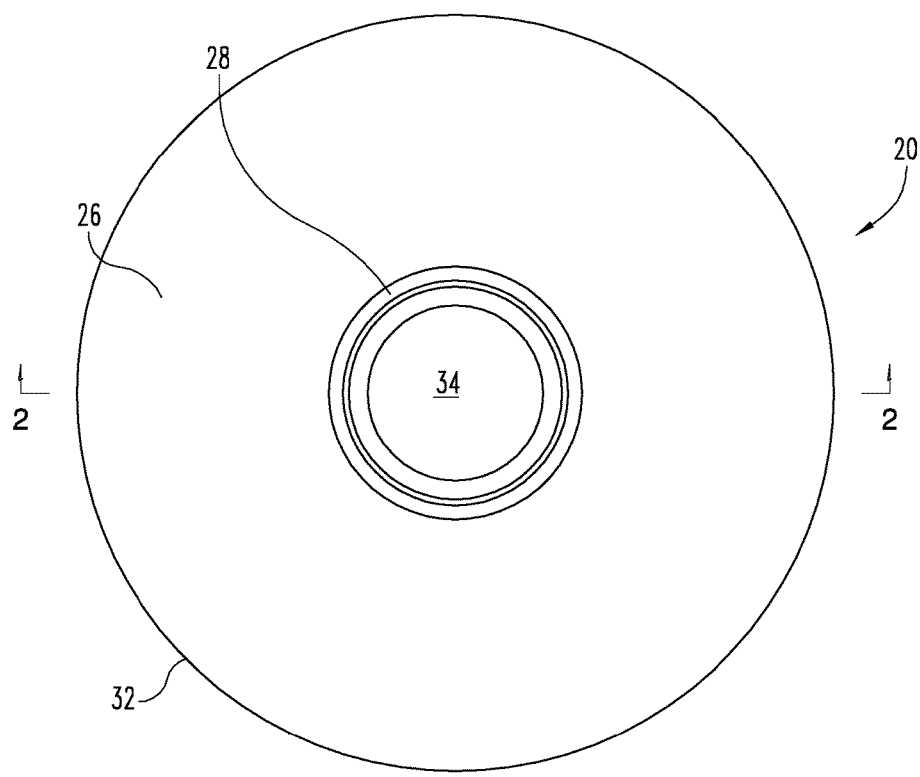
FIG. 1 is a top plan view of an isolation gasket according to one embodiment of the present disclosure.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Figure 2:
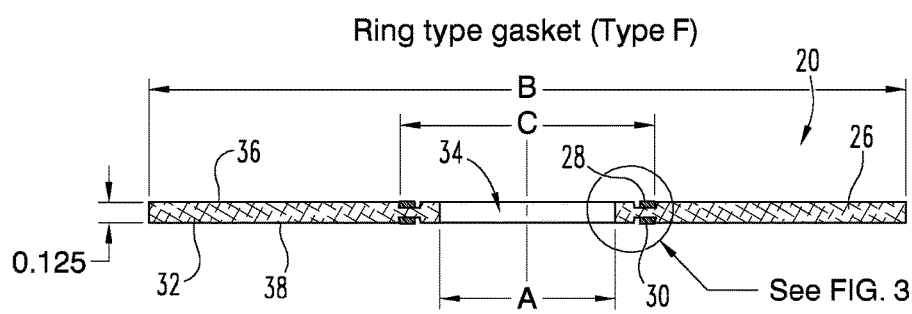
FIG. 2 is a side elevational view, in full section, of the FIG. 1 isolation gasket as viewed along line 2-2 in FIG. 1.
Figure 3:
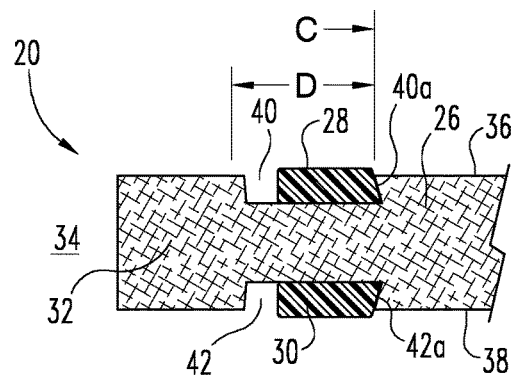
FIG. 3 is a partial, enlarged detail of two seal elements as installed in the FIG. 1 isolation gasket.
Figure 4:
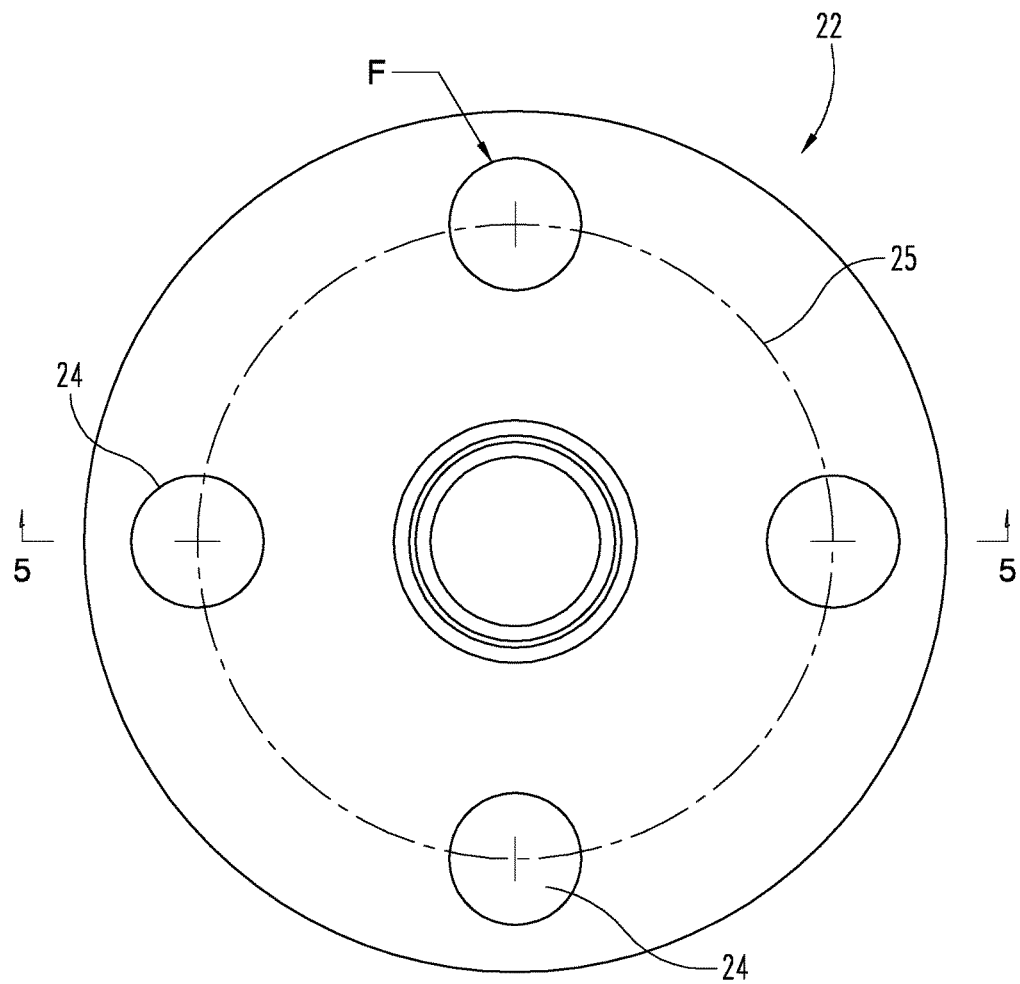
FIG. 4 is a top plan view of an alternative form of the FIG. 1 isolation gasket.
Figure 5:
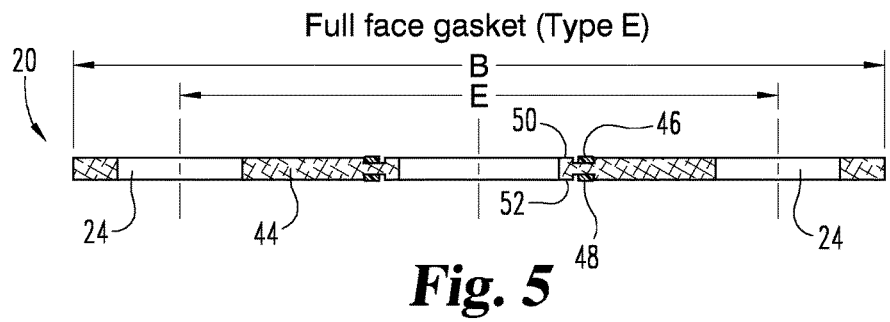
FIG. 5 is a side elevational view, in full section, of the FIG. 4 isolation gasket as viewed along line 5-5 in FIG. 4.

Referring to FIGS. 1-3, there is illustrated an isolation gasket 20 which is within the category or style which does not include a spring energized seal as shown in the isolation gasket style of FIGS. 8-14. Gasket 20 is a ring type gasket (Type F) and according to industry standards for this general type of gasket does not include any bolt holes. Referring to FIGS. 4 and 5, there is illustrated a Type E isolation gasket 22 which does include bolt holes. Gasket 22 is otherwise similar to gasket 20 in construction and function, except that a Type E gasket, according to industry standards, is a full face gasket which includes bolt holes. In the exemplary embodiment, gasket 22 includes four bolt holes 24 which are of generally the same size and diameter, are equally spaced apart and are centered on the same bolt circle 25. It will be understood that the bolts and bolt pattern of the flanges being joined in combination with gasket 22 determine the number, size and spacing of bolt holes 24. With the exception of size differences and the presence of bolt holes 24 in gasket 22, gaskets 20 and 22 are structurally and functionally essentially the same, including the material choices and options.

Gasket 20 includes a retainer 26 and a pair of annular seal elements 28 and 30. The retainer 26 has a generally cylindrical body 32 defining a central bore 34 and including a pair of substantially flat opposing faces 36 and 38. Face 36 defines an annular groove 40 for the receipt of seal element 28. Face 38 defines an annular groove 42 for the receipt of seal element 30. Letters are used to represent the various dimensions and sizes for various embodiments of gaskets 20 and 22. Suitable and compatible dimensional combinations are set forth in Table I, as one example.

TABLE I

| NPS | A | B Ring | B Full Face | C | D | E |
|---|---|---|---|---|---|---|
| 0.5 | 0.62 | 1.76 | 3.5 | 0.945 | 0.07 | 2.38 |
| 0.75 | 0.82 | 2.13 | 3.88 | 1.195 | 0.07 | 2.75 |
| 1 | 1.05 | 2.5 | 4.25 | 1.395 | 0.07 | 3.12 |
| 1.25 | 1.38 | 2.88 | 4.62 | 1.745 | 0.07 | 3.5 |
| 1.5 | 1.61 | 3.26 | 5 | 1.995 | 0.07 | 3.88 |
| 2 | 2.07 | 4 | 6 | 2.55 | 0.085 | 4.75 |
| 3 | 3.07 | 5.25 | 7.5 | 3.75 | 0.085 | 6 |
| 3.5 | 3.55 | 6.25 | 8.5 | 4.25 | 0.085 | 7 |
| 4 | 4.03 | 6.75 | 9 | 4.75 | 0.085 | 7.5 |
| 5 | 5.05 | 7.62 | 10 | 5.75 | 0.085 | 8.5 |
| 6 | 6.07 | 8.62 | 11 | 6.75 | 0.085 | 9.5 |
| 8 | 7.98 | 10.87 | 13.5 | 8.76 | 0.085 | 11.75 |
| 10 | 10.02 | 13.25 | 16 | 11.01 | 0.085 | 14.25 |
| 12 | 12 | 16 | 19 | 13.01 | 0.105 | 17 |
| 14 | 13.25 | 17.63 | 21 | 14.27 | 0.105 | 18.75 |
| 16 | 15.25 | 20.13 | 23.5 | 16.27 | 0.105 | 21.25 |
| 18 | 17.25 | 21.5 | 25 | 18.27 | 0.105 | 22.75 |
| 20 | 19.25 | 23.75 | 27.5 | 20.27 | 0.105 | 25 |
| 24 | 23.25 | 28.12 | 32 | 24.27 | 0.105 | 29.5 |

In terms of the disclosed embodiment, the retainer thickness of approximately 0.125 inches is one of the dimensions of importance and of interest. It is also noted that in the free or uncompressed state seal element 28 extends beyond the surface of face 36 allowing for compression of seal element 28 before the retainer 26 is contacted by the corresponding pipe flange. Similarly, seal element 30 extends beyond the surface of face 38 allowing for compression of seal element 30 before the retainer 26 is contacted by the corresponding pipe flange.

Each gasket 20 and 22 is constructed and arranged for general applications where electrical flange isolation and corrosion control are desired. These gaskets are constructed and arranged to be used between the flanges of adjoining pipe sections which contain water, waste water, gas, natural gas, oil and other hydrocarbon-based medias up to approximately 302 degrees F. (150 degrees C.). Gasket 20 which is constructed and arranged for a ring type joint flange can also be configured for raised face joint flanges as well as flat faced joint flanges. Gasket 22 is constructed and arranged as a full face gasket and this is why bolt holes are provided.

The following details regarding retainer 26 are applicable to retainer 44 of gasket 22. The retainer 26 of gasket 20 defines groove 40 in one face and groove 42 in the opposite face. Each groove is constructed and arranged with an inclined edge geometry, referring to inclined edge surfaces 40a and 42a. This particular groove geometry, see FIG. 3, is designed to improve the elastic memory of each seal element 28, 30 which is received within its corresponding groove 40, 42. The result is a high sealing reliability with a comparative low bolt load. Suitable materials for retainer 26 include G10 fiberglass and phenolic. Suitable materials for each seal element 28, 30 include PTFE (Teflon®), "nitrile" (Buna-N), silicone, Viton® and synthetic rubber such as EPDM (ethylene propylene diene monomer).

The more specific descriptions provided for retainer 26, seal elements 28 and 30 and groove 40 and 42 are fully applicable to gasket 22 which includes retainer 44, annular seal elements 46 and 48 and annular grooves 50 and 52.

Figure 6:
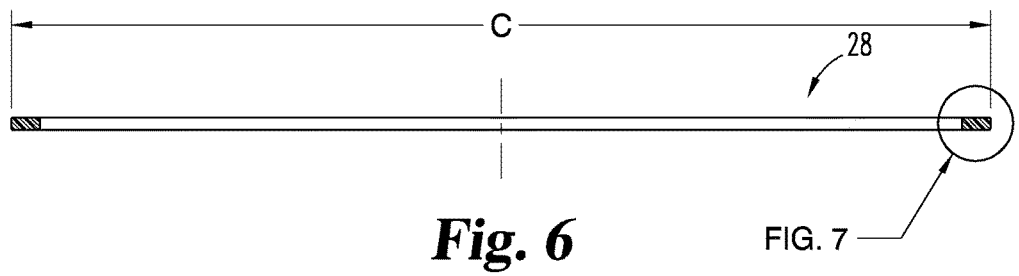
FIG. 6 is a side elevational view of the FIG. 3 seal element, in full form and in full section.
Figure 7:
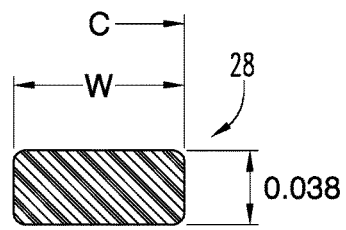
FIG. 7 is an enlarged side elevational view, as a lateral section, of the FIG. 6 seal element.
Figure 8:
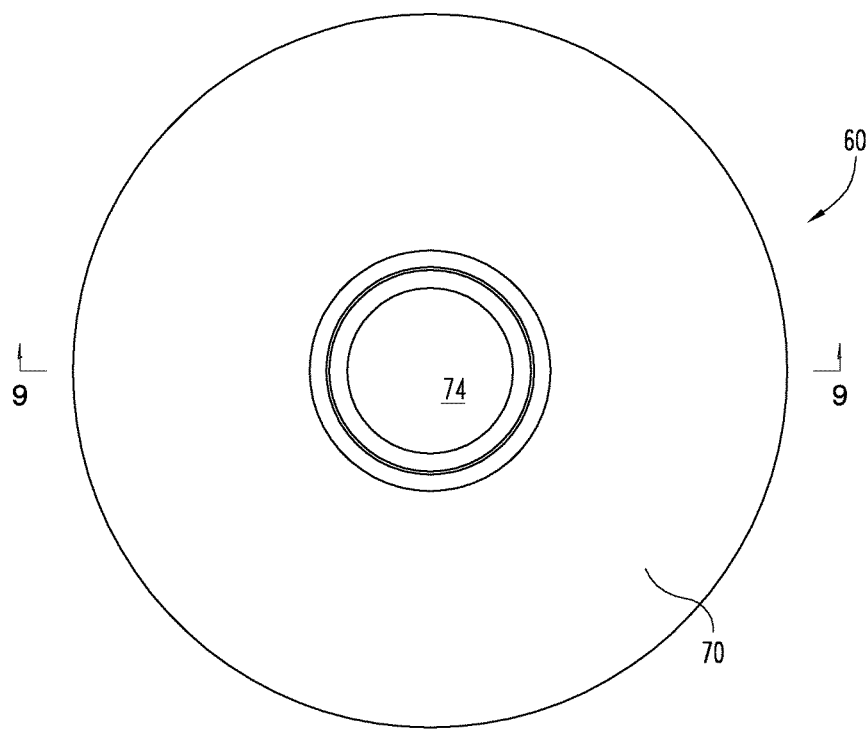
FIG. 8 is a top plan view of an isolation gasket according to another embodiment of the present disclosure.
Figure 9:
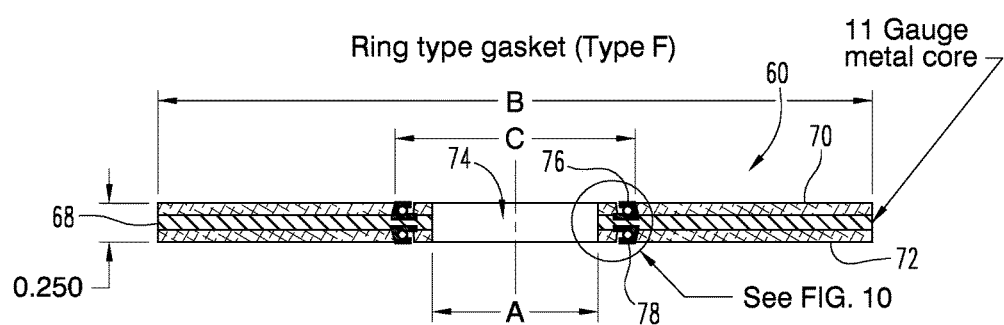
FIG. 9 is a side elevational view, in full section, of the FIG. 8 isolation gasket as viewed along line 9-9 in FIG. 8.
Figure 10:
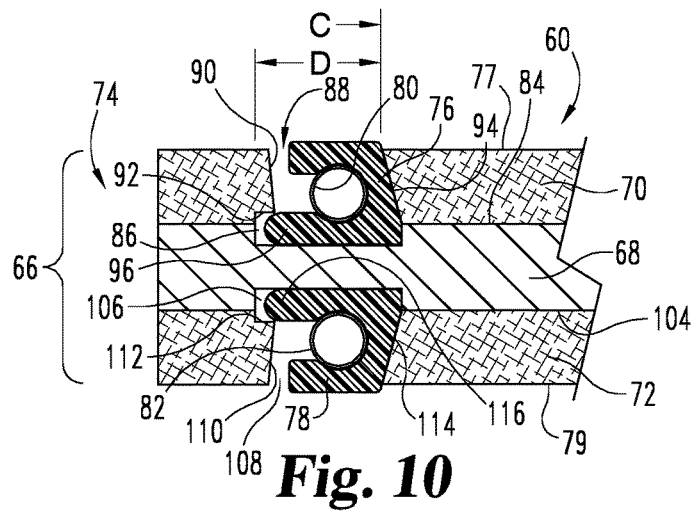
FIG. 10 is a partial, enlarged detail of two seal elements as installed in the FIG. 8 isolation gasket.

The inclined edge geometry of grooves 40 and 42 provides the radially-outer groove surfaces 40a and 42a which compresses a portion of the corresponding seal element 28 (in groove 40) and seal element 30 (in groove 42). Each seal element is an annular, single-piece component, see FIGS. 6 and 7, which has a generally rectangular lateral cross-section. The seal element 28 which is illustrated in FIGS. 6 and 7 is representative of seal elements 30, 46 and 48. When this annular form is wedged into the corresponding annular groove, the compression along one side of the lateral section increases the size of the opposite side of the lateral section. This results in improved elastic memory of each seal element. A representative dimension is shown and the variable dimensions depending on NPS size, are denoted by letters. Table II provides the actual dimensions of each variable based on the corresponding NPS size.

TABLE II

| NPS | Seal OD "C" | Seal Width "W" |
|---|---|---|
| 0.5 | 0.945 | 0.070 |
| 0.75 | 1.195 | 0.070 |
| 1 | 1.395 | 0.070 |
| 1.25 | 1.745 | 0.070 |
| 1.5 | 1.995 | 0.070 |
| 2 | 2.550 | 0.085 |
| 2.5 | 3.250 | 0.085 |
| 3 | 3.750 | 0.085 |
| 3.5 | 4.250 | 0.085 |
| 4 | 4.750 | 0.085 |
| 5 | 5.750 | 0.085 |
| 6 | 6.750 | 0.085 |
| 8 | 8.760 | 0.085 |
| 10 | 11.010 | 0.085 |
| 12 | 13.010 | 0.105 |
| 14 | 14.270 | 0.105 |
| 16 | 16.270 | 0.105 |
| 18 | 18.270 | 0.105 |
| 20 | 20.270 | 0.105 |
| 24 | 24.270 | 0.105 |

Figure 11:
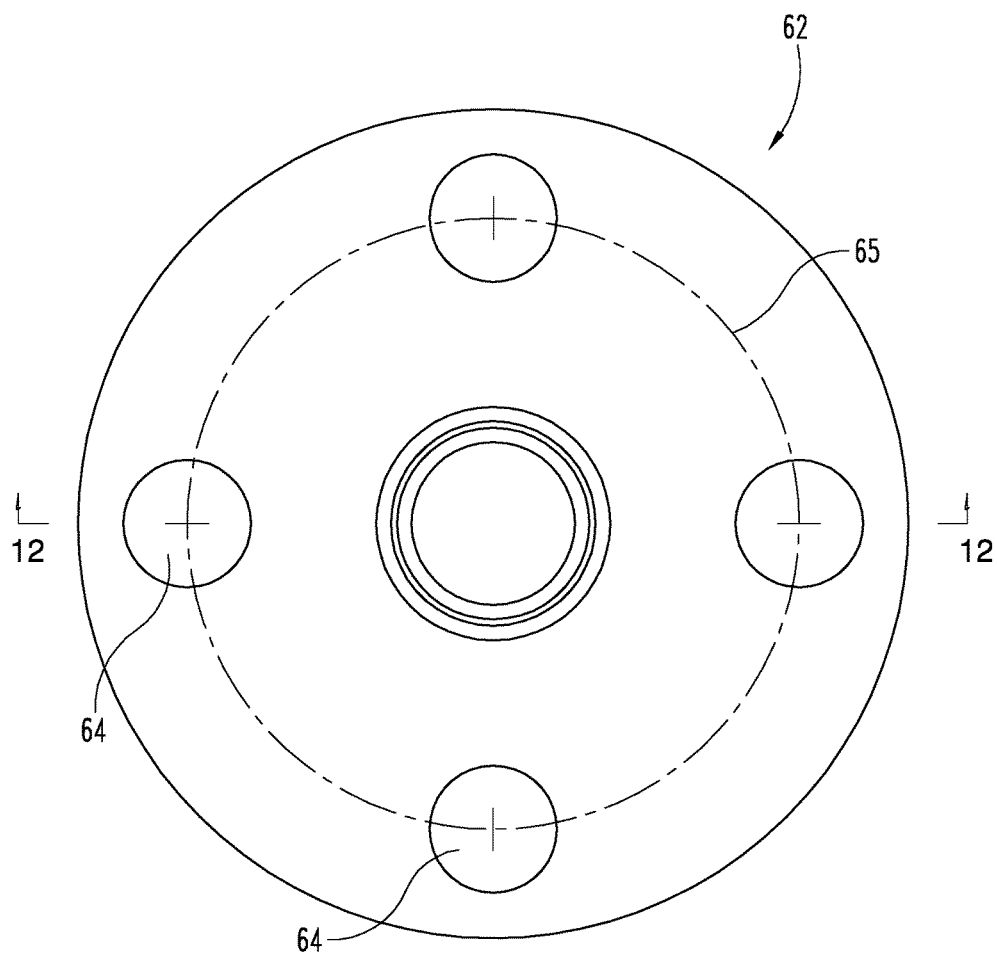
FIG. 11 is a top plan view of an alternative form of the FIG. 8 isolation gasket.
Figure 12:
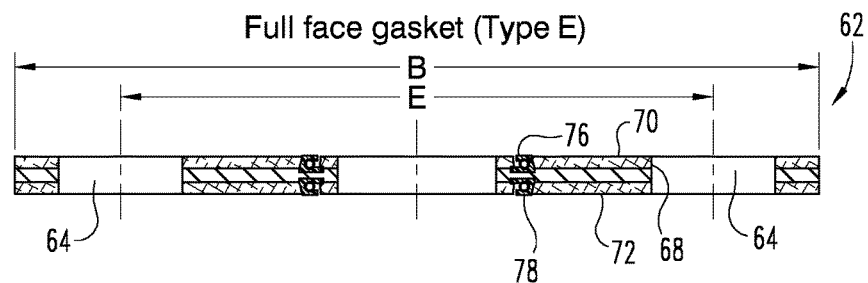
FIG. 12 is a side elevational view, in full section, of the FIG. 11 isolation gasket as viewed along line 12-12 in FIG. 11.

Referring to FIGS. 8-12, there is illustrated an isolation gasket 60 which is within the category or style which includes a spring energized seal. Gasket 60 is a ring type gasket (Type F) and according to industry standards for this general type of gasket, does not include any bolt holes. With reference to FIGS. 11 and 12, there is illustrated a Type E isolation gasket 62. Gasket 62 is otherwise similar to gasket 60 in construction and function, except that a Type E gasket, according to industry standards, is a full face gasket which includes bolt holes. In the exemplary embodiment, gasket 62 includes four bolt holes 64 which are of generally the same size and diameter, are equally spaced apart and are centered on the same bolt circle 65. It will be understood that the bolts and bolt pattern of the flanges being joined in combination with gasket 62 determine the number, size and spacing of bolt holes 64. With the exception of size differences and the presence of bolt holes 64 in gasket 62, gaskets 60 and 62 are structurally and functionally essentially the same, including material choices and options. Accordingly the detailed construction and assembly of gasket 60 will be provided with an understanding that the same applies to gasket 62.

Gasket 60 includes a retainer 66 which is a laminate structure having a metal core 68 and a corresponding G10 or G11 fiberglass laminate layer 70, 72 on each face of the metal core 68. These three layers are securely bonded together into an integral, unitary structure. The retainer 66 is a generally cylindrical lamination defining a central bore 74. Gasket 60 also includes an annular seal element 76 associated with and secured within layer 70 and an annular seal element 78 associated with and received within layer 72. Received within annular seal element 76 is an annular metal spring 80 having a generally circular lateral cross section. Received within annular seal element 78 is an annular metal spring 82 having a generally circular lateral cross section. These metal springs 80, 82 provide a spring energizing force to each seal element 76 and 78, respectively.

Letters are used to represent the variable dimensions and sizes of the various embodiments of gaskets 60 and 62. Suitable and compatible dimensional combinations are set forth in Table III based on and corresponding to the NPS sizes, as one example.

TABLE III

| NPS | A | B Ring | B Full Face | C | D | E |
|---|---|---|---|---|---|---|
| 0.5 | 0.62 | 1.76 | 3.5 | 0.945 | 0.075 | 2.38 |
| 0.75 | 0.82 | 2.13 | 3.88 | 1.195 | 0.075 | 2.75 |
| 1 | 1.05 | 2.5 | 4.25 | 1.395 | 0.075 | 3.12 |
| 1.25 | 1.38 | 2.88 | 4.62 | 1.745 | 0.075 | 3.5 |
| 1.5 | 1.61 | 3.26 | 5 | 1.995 | 0.075 | 3.88 |
| 2 | 2.07 | 4 | 6 | 2.55 | 0.092 | 4.75 |
| 3 | 3.07 | 5.25 | 7.5 | 3.75 | 0.092 | 6 |
| 3.5 | 3.55 | 6.25 | 8.5 | 4.25 | 0.092 | 7 |
| 4 | 4.03 | 6.75 | 9 | 4.75 | 0.092 | 7.5 |
| 5 | 5.05 | 7.62 | 10 | 5.75 | 0.092 | 8.5 |
| 6 | 6.07 | 8.62 | 11 | 6.75 | 0.092 | 9.5 |
| 8 | 7.98 | 10.87 | 13.5 | 8.76 | 0.092 | 11.75 |
| 10 | 10.02 | 13.25 | 16 | 11.01 | 0.092 | 14.25 |
| 12 | 12 | 16 | 19 | 13.01 | 0.092 | 17 |
| 14 | 13.25 | 17.63 | 21 | 14.27 | 0.092 | 18.75 |
| 16 | 15.25 | 20.13 | 23.5 | 16.27 | 0.092 | 21.25 |
| 18 | 17.25 | 21.5 | 25 | 18.27 | 0.092 | 22.75 |
| 20 | 19.25 | 23.75 | 27.5 | 20.27 | 0.092 | 25 |
| 24 | 23.25 | 28.12 | 32 | 24.27 | 0.092 | 29.5 |

In terms of the disclosed embodiment, the retainer thickness of approximately 0.250 inches is one of the dimensions of importance and of interest. This dimension is sufficient for receipt of a spring energized seal element of the type disclosed.

It is also noted that in the free or uncompressed state, seal element 76 extends beyond the surface of face 77 allowing for compression of seal element 76 before the retainer is contacted by the corresponding pipe flange. Similarly, seal element 78 extends beyond the surface of face 79 allowing for compression of seal element 78 before the retainer 66 is contacted by the corresponding pipe flange.

These gasket are constructed and arranged to be used between the flanges of pipes containing gas, natural gas, oil and other hydrocarbon-based medias up to approximately 392 degrees F. (200 degrees C.). The disclosed style of isolation gasket is suitable for flat face, raised face and ring type joint flanges from 0.5 inches to 24 inches, ANSI 150-2500# and API 2-10K. Suitable materials for the seal elements include PTFE (Teflon®), "nitrile" (Buna-N) and Viton®. Gasket 62 is constructed and arranged as a full face gasket and this is why bolt holes are required.

Metal core 68 has a substantially uniform thickness throughout. Each laminate layer 70, 72 has a substantially uniform thickness throughout. One substantially flat face 84 of metal core 68 defines an annular groove 86 which is constructed and arranged to receive a portion of seal element 76. In a cooperating and complimenting manner, laminate layer 70 is shaped with an annular aperture 88. Aperture 88 includes a radially-inner, angled surface 90 with an annular undercut edge 92, which creates an offset, annular lip which cooperates with groove 86 to capture lip 96. The radially-outer surface 94 of aperture 88 is also angled. The combination of groove 86 and edge 92 creates an annular space which captures the annular lip 96 of seal element 76. The capturing of lip 96 in cooperation with the angled shape of surface 94 allows annular seal element 76 to be pressed into position and it becomes secure in that position without the need to use any bonding agent or bonding material, such as glue or adhesive. Seal element 76 cannot become loose or fall out due to normal handling and positioning of gasket 60 (and similarly of gasket 62).

The other substantially flat face 104 of metal core 68 defines an annular groove 106 which is constructed and arranged to receive a portion of seal element 78. In a cooperating and complimenting manner, laminate layer 72 is shaped with an annular aperture 108. Aperture 108 includes a radially-inner, angled surface 110 with an annular undercut edge 112. The radially-outer surface 114 of aperture 108 is also angled. The combination of groove 106 and edge 112 creates an annular space which captures the annular lip 116 of seal element 78. The capturing of lip 116 in cooperation with the angled shape of surface 114 allows annular seal element 78 to be pressed into position and it becomes secure in that position without the need to use any glue or adhesive. Seal element 78 cannot become loose or fall out due to normal handling and positioning of gasket 60 (and similarly of gasket 62). The gasket 60 and gasket 62 constructions disclosed herein each combine the technology of a press-in, pressure activated seal with a unique groove that retains the seal element without the use of glue or adhesive on the key or critical contact surfaces.

The cooperation of annular groove 86 and edge 92 for the snap-fit capture of lip 96 is constructed and arranged on the inner radial side of the seal element 76. A similar inner radial side construction and arrangement exists for annular groove 106 and edge 112 for the snap-fit capture of lip 116. However, as an alternative construction for seal elements 76 and 78, this inner radial side construction of gasket 60 can be flipped or reversed, similar to a mirror image, to the outer radial side. As viewed in FIG. 10, this alternative construction takes the shapes and contours which are on the left side of the metal springs 80, 82 and exchanges or reverses those shapes and contours with the shapes and contours which are on the right side of the metal springs 80, 82. The sizes, shapes and relationships of the disclosed components on one side all remain the same, only switched from side to the opposite side, and vice-versa.

Figure 17:
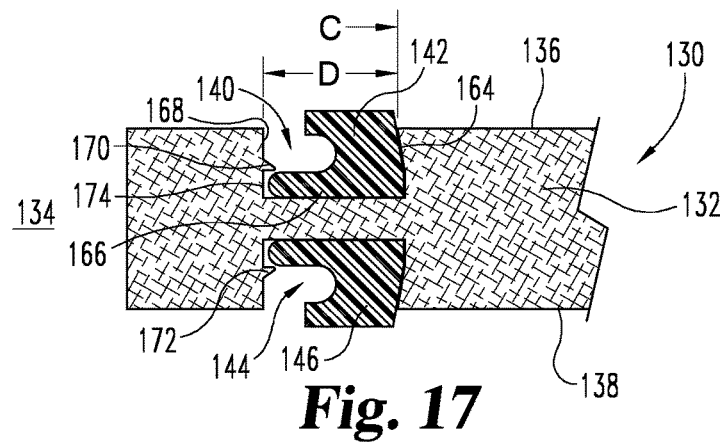
FIG. 17 is a partial, enlarged detail of the seal element as installed in the FIG. 15 isolation gasket.

With regard to the construction of isolation gasket 130, as illustrated in FIG. 17, this same type of reversal from the inner radial side to the outer radial side is an option. If an imaginary axial centerline is envisioned as a tangent line to the curved base of annular groove 140, then the switch or reversal is from one side of this axial centerline to the opposite side of this axial centerline. The overall structures and structural relationships remain the same, similar to a mirror image which is a left-to-right "flip over" of 180 degrees.

Figure 13:
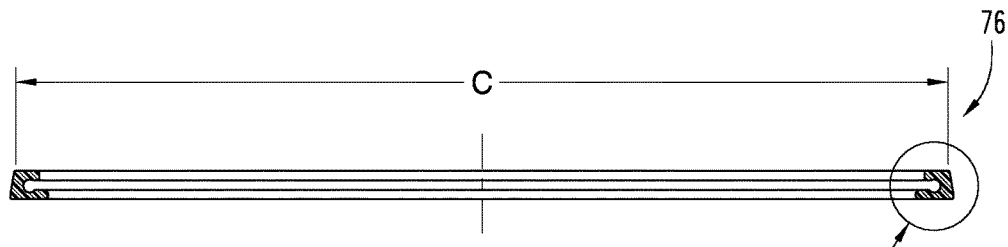
FIG. 13 is a side elevational view of the FIG. 10 seal element, in full form and in full section.
Figure 14:
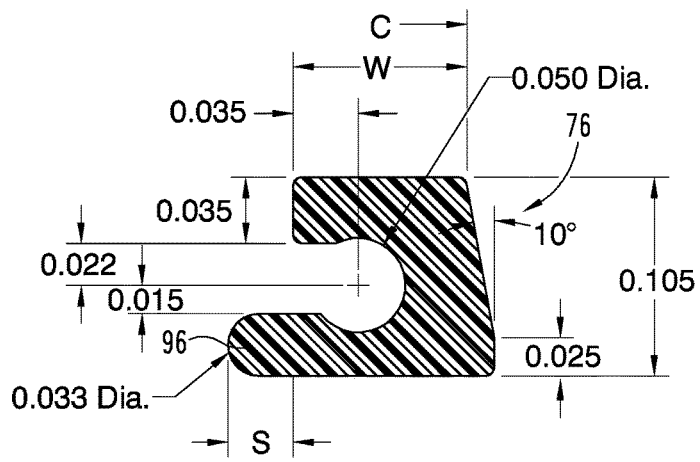
FIG. 14 is an enlarged side elevational view, as a lateral section, of the FIG. 13 seal element.

Each seal element 76 and 78 is an annular, single-piece component. The description for seal element 78 is essentially the same as for seal element 76. The details of seal element 76 are illustrated in FIGS. 13 and 14. Representative dimensions are shown and the variable dimensions, depending on NPS size, are shown by letters. Table IV provides the actual dimensions for each variable based on the corresponding NPS size.

TABLE IV

| NPS | Seal OD "C" | Seal Width "W" | Seal Snap "S" |
|---|---|---|---|
| 0.5 | 0.945 | 0.075 | 0.013 |
| 0.75 | 1.195 | 0.075 | 0.013 |
| 1 | 1.395 | 0.075 | 0.013 |
| 1.25 | 1.745 | 0.075 | 0.013 |
| 1.5 | 1.995 | 0.075 | 0.013 |
| 2 | 2.550 | 0.092 | 0.018 |
| 2.5 | 3.250 | 0.092 | 0.018 |
| 3 | 3.750 | 0.092 | 0.018 |
| 3.5 | 4.250 | 0.092 | 0.018 |
| 4 | 4.750 | 0.092 | 0.018 |
| 5 | 5.750 | 0.092 | 0.018 |
| 6 | 6.750 | 0.092 | 0.018 |
| 8 | 8.760 | 0.092 | 0.018 |
| 10 | 11.010 | 0.092 | 0.018 |
| 12 | 13.010 | 0.092 | 0.018 |
| 14 | 14.270 | 0.092 | 0.018 |
| 16 | 16.270 | 0.092 | 0.018 |
| 18 | 18.270 | 0.092 | 0.018 |
| 20 | 20.270 | 0.092 | 0.018 |
| 24 | 24.270 | 0.092 | 0.018 |

Figure 15:
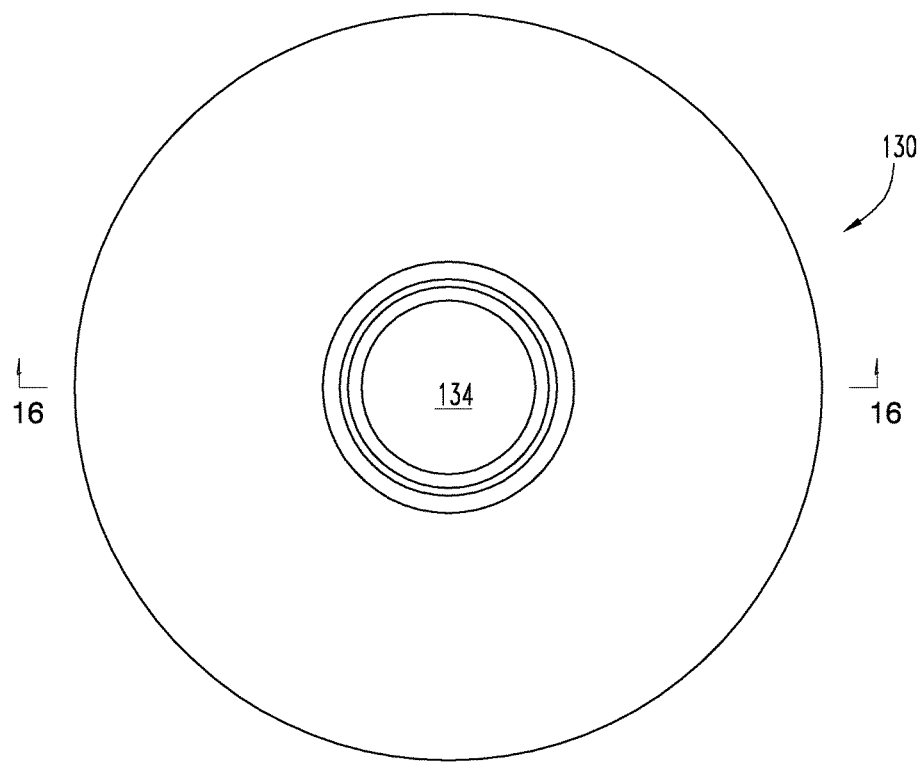
FIG. 15 is a top plan view of an isolation gasket according to another embodiment of the present disclosure.
Figure 16:
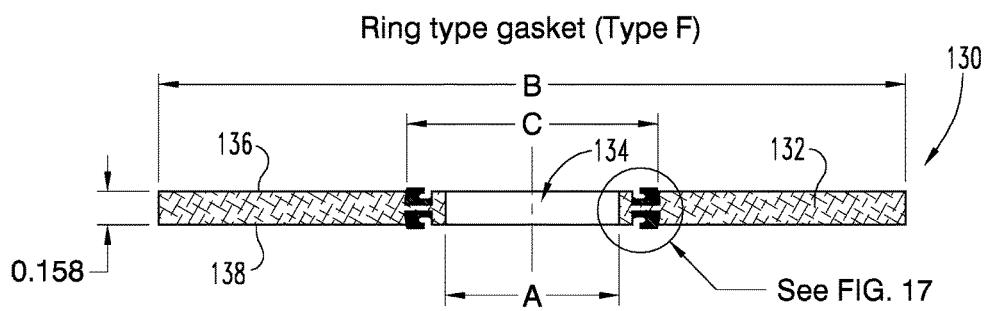
FIG. 16 is a side elevational view, in full section, of the FIG. 15 isolation gasket as viewed along line 16-16 in FIG. 15.

Referring now to FIGS. 15-17, there is illustrated an isolation gasket 130 which is constructed and arranged for more critical and extreme applications without using or requiring a steel core. Gasket 130 includes a generally cylindrical retainer 132 which in the preferred embodiment is either a G10 or G11 fiberglass laminate material measuring approximately 0.158 inches thick. Retainer 132 defines a generally concentric generally cylindrical bore 134. Retainer 132 is constructed and arranged with a pair of substantially flat opposing faces 136 and 138. A first face 136 defines an annular groove 140 for the receipt of annular seal element 142. The opposite face 138 defines an annular groove 144 for the receipt of annular seal element 146.

Figure 18:
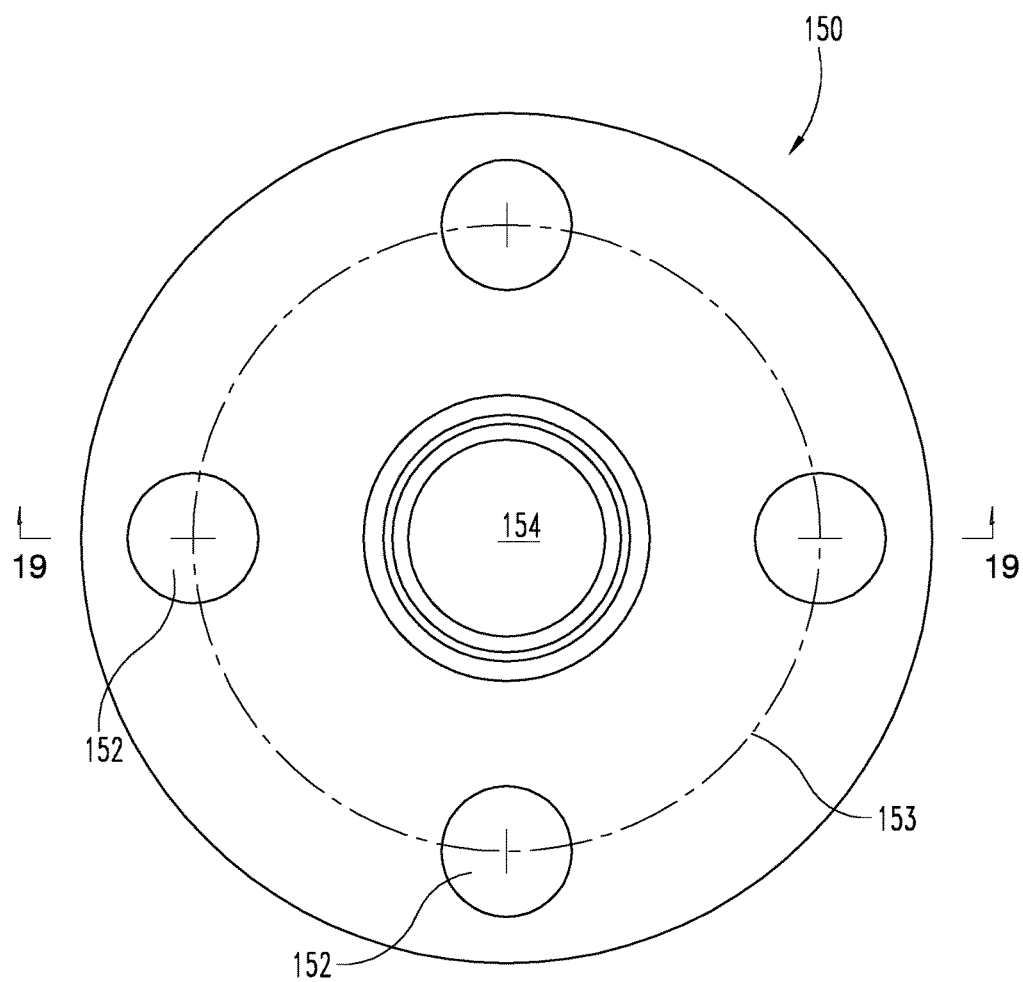
FIG. 18 is a top plan view of an alternative form of the FIG. 15 isolation gasket.
Figure 19:
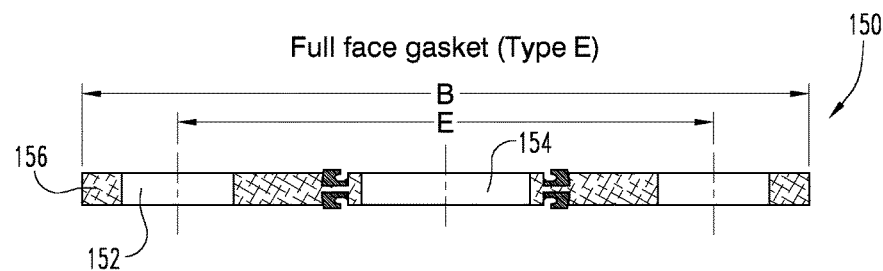
FIG. 19 is a side elevational view, in full section, of the FIG. 18 isolation gasket as viewed along line 19-19 in FIG. 18.

Gasket 130 is a ring type gasket (Type F) and according to industry standards for this general type of gasket, does not include any bolt holes. Gasket 150, referring now to FIGS. 18 and 19, is a Type E isolation gasket according to the present disclosure. Gasket 150 is otherwise similar to gasket 130 in construction and function, except that a Type E gasket according to industry standards, is a full face gasket which includes bolt holes. In the exemplary embodiment gasket 150 includes four bolt holes 152 which are of generally the same size (i.e. diameter), are equally space apart and are centered on the same bolt circle 153. The center bore 154 which is defined by retainer 156 is generally concentric with the bolt circle 153. It will be understood that the bolts and the bolt pattern of the flanges being joined in combination with gasket 150 determines the number, size and spacing of bolt holes 152. With the exception of size differences and the presence of bolt holes 152, gaskets 130 and 150 are structurally and functionally essentially the same, including the material choices and options. The detailed description of gasket 130 generally corresponds to and provides the description of gasket 150.

Letters are used in the drawings to represent the variable dimensions and sizes for various embodiments of gasket 130 and 150. Suitable and compatible dimensional combinations are set forth in Table V, as one example.

TABLE V

| NPS | A | B Ring | B Full Face | C | D | E |
|---|---|---|---|---|---|---|
| 0.5 | 0.62 | 1.76 | 3.5 | 0.945 | 0.07 | 2.38 |
| 0.75 | 0.82 | 2.13 | 3.88 | 1.195 | 0.07 | 2.75 |
| 1 | 1.05 | 2.5 | 4.25 | 1.395 | 0.07 | 3.12 |
| 1.25 | 1.38 | 2.88 | 4.62 | 1.745 | 0.07 | 3.5 |
| 1.5 | 1.61 | 3.26 | 5 | 1.995 | 0.07 | 3.88 |
| 2 | 2.07 | 4 | 6 | 2.55 | 0.09 | 4.75 |
| 3 | 3.07 | 5.25 | 7.5 | 3.75 | 0.09 | 6 |
| 3.5 | 3.55 | 6.25 | 8.5 | 4.25 | 0.09 | 7 |
| 4 | 4.03 | 6.75 | 9 | 4.75 | 0.09 | 7.5 |
| 5 | 5.05 | 7.62 | 10 | 5.75 | 0.09 | 8.5 |
| 6 | 6.07 | 8.62 | 11 | 6.75 | 0.09 | 9.5 |
| 8 | 7.98 | 10.87 | 13.5 | 8.76 | 0.09 | 11.75 |
| 10 | 10.02 | 13.25 | 16 | 11.01 | 0.09 | 14.25 |
| 12 | 12 | 16 | 19 | 13.01 | 0.09 | 17 |
| 14 | 13.25 | 17.63 | 21 | 14.27 | 0.09 | 18.75 |
| 16 | 15.25 | 20.13 | 23.5 | 16.27 | 0.09 | 21.25 |
| 18 | 17.25 | 21.5 | 25 | 18.27 | 0.09 | 22.75 |
| 20 | 19.25 | 23.75 | 27.5 | 20.27 | 0.09 | 25 |
| 24 | 23.25 | 28.12 | 32 | 24.27 | 0.09 | 29.5 |

Each gasket 130, 150 is constructed and arranged and suitable for use when electrical isolation and corrosion control are required on pipes containing gas, natural gas, oil and other hydrocarbon-based media up to approximately 392 degrees F. (200 degrees C.). These gasket are constructed and arranged to be suitable for flat face, raised face and ring type joint flanges from approximately 0.5 inches to 24 inches, ANSI 150-2500# and API 2-10K.

Gaskets 20 and 22 are constructed and arranged in order to provide one or more performance benefits for the type of environment and the type of pipe flange applications which have been described. Similarly, gaskets 60 and 62 are constructed and arranged in order to provide one or more performance benefits for the type of environment and the type of pipe flange applications which have been described. Gaskets 130 and 150 are constructed and arranged in a manner which is intended to capture at least one benefit achieved by the construction of gaskets 20 and 22 and at least one benefit achieved by the construction of gaskets 60 and 62. The combination of these one or more extracted benefits is able to be realized by the construction and arrangement of gaskets 130 and 150.

More specifically, a performance benefit of gasket 20 (and of gasket 22) is the absence of metal as part of the gasket construction. For an "isolation" gasket this is a benefit because it takes metal out of the equation in terms of conductivity and electrical isolation. Gaskets 130 and 150 do not include any metal core nor any metal spring. In the case of gasket 60 (and gasket 62) the thicker retainer 66 (0.25 inches) compared to the thinner construction (0.125 inches) of retainer 26 permits the addition and capture of a more substantial annular seal element 76, 78 which is spring energized. In addition to a balancing of structural features for gasket 130 (and gasket 150) in order to be able to realize performance benefits attributable to the other gasket constructions disclosed herein, gaskets 20 and 60, other structural features were introduced as a type of compromise or balancing in order to provide an improved isolation gasket which blends and balances important characteristics.

For example, as the retainer is made thicker, the concerns (material creep and degradation) regarding thicker glass reinforced apoxy (GRE) materials, begin to appear. Yet a thicker retainer provides more options for the type of seal element to be used. If the GRE material is split into two thinner laminate layers and then separated by a metal core to preserve the overall thickness of the retainer, metal is then introduced into the equation for an isolation gasket.

Gaskets 130 and 150 each represent a structural blend of features which result in a novel and unobvious balance of gasket performance benefits. More specifically, the retainer thickness of the preferred embodiment is approximately 0.158 plus or minus 0.005 inches. This construction is thicker than the retainer 26 of gasket 20 and thereby provides added thickness for the capture of a larger or thicker seal element. While the issues or material creep and degradation for the GRE material increase with increased axial thickness of that material, a compromise dimension of 0.158 plus or minus 0.005 inches is substantially less than the 0.25 dimension of gasket 60, without the introduction of metal into the equation. The absence of metal contributes to the performance of gasket 130 (and of gasket 150) as an isolation gasket. The seal elements 142 and 146 are able to be made larger than seal elements 28 and 30, due to the increased thickness of the retainer 132.

While the axial thickness dimension of 0.158 plus or minus 0.005 inches is regarded as the preferred embodiment, it is recognized that certain existing applications may still need or prefer to have a thicker retainer and while other features of gaskets 130 and 150 provide certain performance benefits, it is recognized that a retainer thickness of 0.250 could be maintained for those specific applications or needs while at the same time still taking advantage of the other design benefits disclosed as part of gaskets 130 and 150.

Referring again to FIG. 17, the specific construction and arrangement of each groove 140 and 144 is illustrated. Each groove includes a radially-outer wall surface 164 which is set at a slight outwardly incline in an axial direction. The annular base surface 166 of each groove 140, 144 is substantially flat and generally parallel with the outer surface of face 136 and with the outer surface of face 138. The radially-inner wall surface 168 of each groove is substantially parallel with the axis of bore 134 and is substantially perpendicular to base surface 166. Extending into groove 140 from surface 168 is an annular lip 170. A similar annular lip 172 exists as part of groove 144. Lip 170, and similarly for lip 172, creates an inner wall channel 174 whose three defining surfaces are provided by a portion of base surface 166, a portion of inner wall surface 168 and lip 170. This channel 174 is constructed and arranged to receive and capture a radially protruding portion 175 of seal element 142, as is illustrated. A similar construction exists with lip 172, groove 144 and seal element 146.

The creation of channel 174 in cooperation with the shape of radially-outer wall surface 164 results in a novel and unobvious way to capture and retain seal element 142 in groove 140 without needing to use any adhesive or glue. Once each seal element 142, 146 is pressed into position and fully seated into its corresponding groove 140, 144, the seal element is essentially locked in position within its corresponding groove and stay in position within the corresponding groove without requiring any bonding agent or bonding material, such as adhesive or glue. The radially protruding portion 175 of each seal element 142, 146 is captured beneath the corresponding annular lip 170, 172. The size and shape of each seal element causes it to fit within its corresponding groove with only very slight radial clearance. Axial pullout due to normal handling and manipulation is prevented by the use of lip 170 (and lip 172), by the nature of the incline provided by wall surface 164 and by the overall shaping and geometry of the corresponding seal element. The gasket 130 and gasket 150 constructions disclosed herein each combine the technology of a press-in, pressure activated seal with a unique groove that retains the seal element without the use of glue or adhesive on the key or critical contact surfaces.

Figure 20:
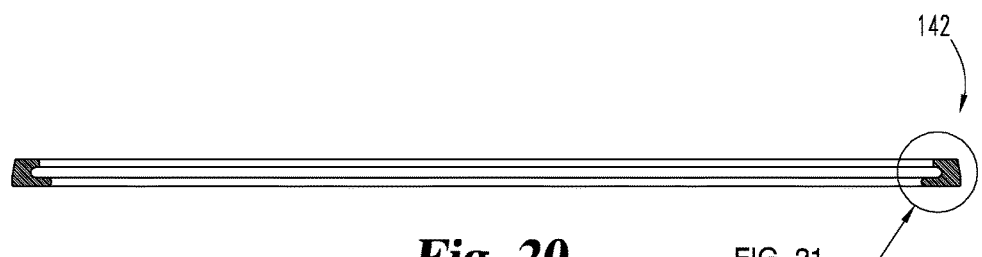
FIG. 20 is a side elevational view of the FIG. 17 seal element, in full form and in full section.
Figure 21:
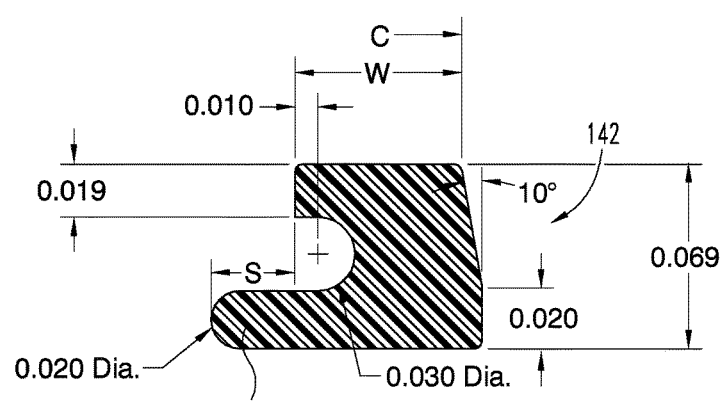
FIG. 21 is an enlarged side elevational view, as a lateral section, of the FIG. 20 seal element.

Referring now to FIGS. 20 and 21, the structural details of seal element 142 are illustrated and seal element 146 is of essentially the same construction. Seal element 142 is a unitary, single-piece annular member with a shaping and contouring which is shown in FIG. 21. The representative dimensions of the preferred construction of seal element 142 are included. The variable dimensions which reflect the dimensions for different NPS sizes are denotes by letters. Table VI provides the actual dimensions for these letter designations as a function of the NPS size.

TABLE VI

| NPS | Seal OD "C" | Seal Width "W" | Seal Snap "S" |
|---|---|---|---|
| 0.5 | 0.945 | 0.070 | 0.031 |
| 0.75 | 1.195 | 0.070 | 0.031 |
| 1 | 1.395 | 0.070 | 0.031 |
| 1.25 | 1.745 | 0.070 | 0.031 |
| 1.5 | 1.995 | 0.070 | 0.031 |
| 2 | 2.550 | 0.090 | 0.046 |
| 2.5 | 3.250 | 0.090 | 0.046 |
| 3 | 3.750 | 0.090 | 0.046 |
| 3.5 | 4.250 | 0.090 | 0.046 |
| 4 | 4.750 | 0.090 | 0.046 |
| 5 | 5.750 | 0.090 | 0.046 |
| 6 | 6.750 | 0.090 | 0.046 |
| 8 | 8.760 | 0.090 | 0.046 |
| 10 | 11.010 | 0.090 | 0.046 |
| 12 | 13.010 | 0.090 | 0.046 |
| 14 | 14.270 | 0.090 | 0.046 |
| 16 | 16.270 | 0.090 | 0.046 |
| 18 | 18.270 | 0.090 | 0.046 |
| 20 | 20.270 | 0.090 | 0.046 |
| 24 | 24.270 | 0.090 | 0.046 |

Suitable materials for seal element 142 include PTFE (Teflon®), "nitrile" and Viton®.

Referring now to FIGS. 22 and 23, the structural details of an alternative seal element 180 are illustrated. Seal element 180 is a unitary, single-piece annular member with the shaping and contouring which is shown in FIG. 23. The representative dimensions of the preferred construction of seal element 180 are included. The variable dimensions which reflect the dimensions for different NPS sizes are denoted by letters. Table VII provides the actual dimensions for the letter designations as a function of NPS size.

TABLE VII

| NPS | Seal OD "C" | Seal Width "W" | Seal Snap "S" |
|---|---|---|---|
| 0.5 | 0.945 | 0.075 | 0.013 |
| 0.75 | 1.195 | 0.075 | 0.013 |
| 1 | 1.395 | 0.075 | 0.013 |
| 1.25 | 1.745 | 0.075 | 0.013 |
| 1.5 | 1.995 | 0.075 | 0.013 |
| 2 | 2.550 | 0.092 | 0.018 |
| 2.5 | 3.250 | 0.092 | 0.018 |
| 3 | 3.750 | 0.092 | 0.018 |
| 3.5 | 4.250 | 0.092 | 0.018 |
| 4 | 4.750 | 0.092 | 0.018 |
| 5 | 5.750 | 0.092 | 0.018 |
| 6 | 6.750 | 0.092 | 0.018 |
| 8 | 8.760 | 0.092 | 0.018 |
| 10 | 11.010 | 0.092 | 0.018 |
| 12 | 13.010 | 0.092 | 0.018 |
| 14 | 14.270 | 0.092 | 0.018 |
| 16 | 16.270 | 0.092 | 0.018 |
| 18 | 18.270 | 0.092 | 0.018 |
| 20 | 20.270 | 0.092 | 0.018 |
| 24 | 24.270 | 0.092 | 0.018 |

Suitable materials for seal element 180 are the same as those suitable materials for seal element 142.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A gasket for use between adjoining pipe flanges, said gasket comprising:
   a retainer defining a bore and including,
      a first layer,
      a second layer, and
      an intermediate layer which is positioned between said first layer and said second layer,
         said retainer defining a first annular channel formed in said first layer in cooperation with said intermediate layer and a second annular channel formed in said second layer in cooperation with said intermediate layer said first layer defining an annular aperture and said intermediate layer defining an annular groove comprising generally flat axial side walls,
         said annular aperture and said annular groove cooperating to form said first annular channel, said annular aperture including a radially-inner, angled surface extending into a undercut formed between the first and intermediate layers and which extends in a radially inward direction from said angled surface, and including a radially-outer angled surface extending to one of the generally flat axial side walls; and
   a first seal element received within said first annular channel and generally substantially filling the annular channel, said first seal element including a seal retention portion comprising a radially inner annular lip extending radially from the first seal element into said annular groove and said undercut, and the first seal element contacting the one of the generally flat axial side walls and the radially-outer angled surface.

2. The gasket of claim 1, which further includes: a second seal element received within said second annular channel.

3. The gasket of claim 2, wherein said second seal element has an axial thickness of approximately 0.105 inches.

4. The gasket of claim 1, wherein said first seal element has an axial thickness of approximately 0.105 inches.

5. The gasket of claim 1, wherein said retainer has an axial thickness of approximately 0.25 inches.

6. The gasket of claim 1, wherein assembly and retention of said first seal element into said first annular channel is accomplished without the use of a bonding material.

* * * * *